Figures 1, 2:
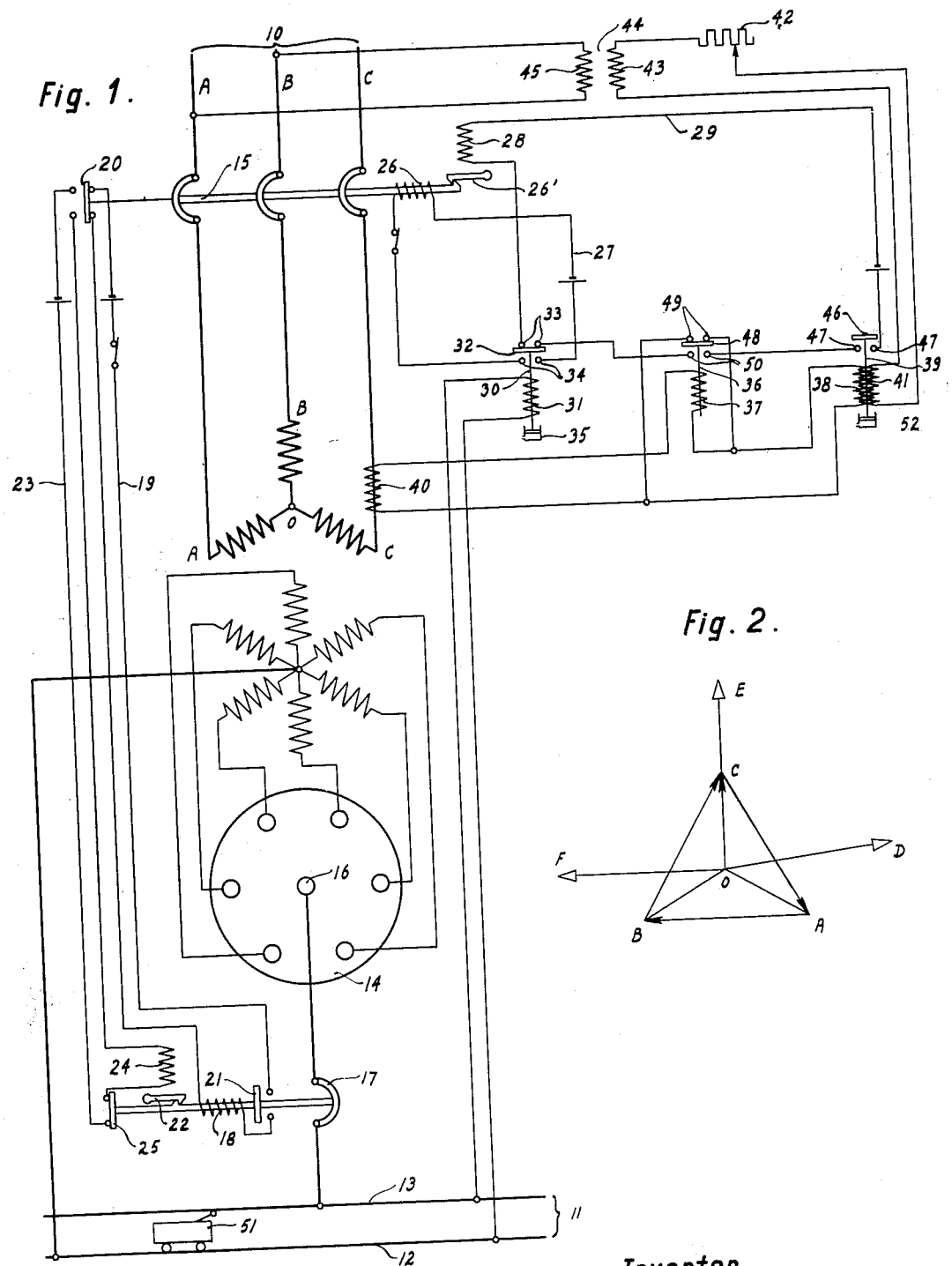

April 19, 1932.  H. WINOGRAD  1,854,606

RECTIFYING SYSTEM

Filed March 26, 1929

Inventor
Harold Winograd
By Alfred H. Dyson
Attorney

Patented Apr. 19, 1932

1,854,606

UNITED STATES PATENT OFFICE

HAROLD WINOGRAD, OF COLLINGSWOOD, NEW JERSEY, ASSIGNOR, BY MESNE ASSIGNMENTS, TO ALLIS-CHALMERS MANUFACTURING COMPANY, OF MILWAUKEE, WISCONSIN, A CORPORATION OF DELAWARE

RECTIFYING SYSTEM

Application filed March 26, 1929. Serial No. 349,935.

This invention relates to improvements in rectifying systems.

In electric railways wherein the power supply comprises a high voltage alternating-current line, and the load, such as the driving motors for the cars or locomotives, requires direct-current, substations are installed at proper points along the right-of-way for the purpose of conversion or rectification of the alternating-current to direct-current, automatic control for such stations being provided whereby the same are put into operation only when needed to provide adequate supply to the load or direct-current line, as determined by the load demand.

Where such substations have comprised converting or rectifying apparatus in the form of a mercury vapor rectifier and associated parts including a suitable transformer secondary winding having a neutral point, and suitable operating connections between the direct-current line and such neutral point and the cathode of the rectifier, the practice heretofore has been to place a shunt in one of such connections and to connect a suitable relay device across the same for the purpose of automatically governing the usual tripping-circuit for the circuit breaker providing connection to the alternating-current supply line, the action, generally, being such that when the boosting action of the substation is no longer needed, and the load current accordingly drops to a predetermined value below normal, the relay device functions to effect tripping or opening operation of the circuit breaker.

While the automatic control used heretofore has provided for satisfactory control of the substations, the magnitude of the currents to which the shunts referred to are necessarily subjected has made necessary design of the shunts to such size as to make the same expensive and difficult to install in installations where space requirements must be considered.

The relatively large shunts used heretofore, furthermore, appreciably increase the losses in the substation, and reduce the efficiency thereof a corresponding amount.

One of the objects of the present invention, therefore, is to provide an improved rectifying system which may be embodied in a substation for an electric railway and wherein means are provided for automatically cutting the system out of operation at relatively low current or no-load conditions with the same accuracy as in the systems used heretofore, but with the omission of the expensive shunts referred to and their disadvantages.

Other objects and advantages will hereinafter appear.

For the purpose of illustrating the invention, one embodiment thereof is shown in the drawings, wherein Figure 1 is a diagrammatic view of a rectifying system embodying the present improvements; and Fig. 2 is a vector diagram showing voltage and current conditions in the improved system.

The rectifying system comprises, generally, the alternating-current line 10 having the phases A, B and C, the direct-current line 11 comprising the track 12 and the trolley or third rail 13, means providing for current-rectifying action between the lines and including the mercury arc rectifier 14, and the switch means or circuit breaker 15 providing an operating connection between the alternating-current line and the current-rectifying means. The cathode 16 of the rectifier is connected to the trolley or third rail by the circuit breaker 17 having the closing coil 18 excited by the local circuit 19 controlled by the switch element 20 carried by circuit breaker 15, the arrangement being such that upon closing operation of circuit breaker 15, switch element 20 operates to close circuit 19 to excite closing coil 18. Upon substantial completion of closing operation of circuit breaker 17, the switch element 21 associated therewith operates to open circuit 19, the latch 22 having previously moved into latching position to hold this circuit breaker in closed position.

During opening operation of circuit breaker 15, switch element 20 closes local circuit 23 to excite the tripping coil 24 associated with latch 22, whereupon circuit breaker 17 also opens in the usual manner.

Upon substantial completion of opening operation of circuit breaker 17, the switch element 25 associated therewith operates to open circuit 23.

From the foregoing it will be seen that circuits 19 and 23, and the associated parts, provide an interlock between the circuit breakers whereby closing and opening operations of circuit breaker 15 are accompanied by the same respective operations of circuit breaker 17.

The circuit breaker 15 is provided with the closing coil 26 excited by circuit 27, and with the tripping coil 28 excited by circuit 29.

The circuit breakers may be of any suitable and well-known construction.

The relay 30 is provided with the operating winding 31 connected, as shown, across the direct-current line 11, the arrangement being such that upon drop of the voltage in line 11, at the substation, to a predetermined low value, excitation of winding 31 is insufficient to hold switch element 32 of the relay in position to close contacts 33 of tripping-circuit 29, whereupon the switch element moves under the action of gravity or suitable spring means to close contacts 34 and complete the closing-circuit 27. Circuit breaker 15 then closes under the action of closing coil 26, and is held in closed position by latch 26'. The substation now being in operation, the voltage in the direct-current line, at the substation, is such as to energize winding 31 of relay 30 to effect movement of switch element 32 out of bridging relation with contacts 34 and into such relation with contacts 33. The relay 30 is provided with a dash-pot 35 to provide for such time-delay action of the relay as might be found desirable in its operation to move switch element 32 to one position or the other.

The relay 36 is provided with the operating winding 37 connected in series with the current coil 38 of a relay 39 and with the secondary winding 40 of a suitable current transformer disposed as shown in phase C of alternating-current line 10. The relay 39 is also provided with a voltage winding 41 co-operating with current winding 38 in the manner and for the purpose hereinafter explained.

The voltage winding 41 is connected through a suitable resistance 42 to the secondary 43 of a potential transformer 44 having its primary 45 connected across phases A and B of line 10, the transformer 44 and associated connections thereby providing means for rendering voltage winding 41 responsive to voltage conditions between phases A and B of line 10. The switch element 46 of relay 39 operates to open or close contacts 47 of tripping-circuit 29.

The switch element 48 of relay 36 operates when in the position shown to bridge contacts 49 and short-circuit current winding 38 of relay 39, element 48 operating when in its other position to bridge contacts 50 of tripping-circuit 29.

The theory of operation of the automatic control apparatus will now be explained, referring more particularly to Fig. 2. The current winding 38 of relay 39 is traversed by the magnetizing current OD of the rectifier transformer and by the load current OE. The magnetizing current OD of the rectifier transformer lags behind the phase voltage OC by nearly 90 degrees, as shown. The load current OE is in phase with the phase voltage OC. The exciting or magnetizing current OF of voltage coil 41 is substantially in phase with line voltage AB, the latter being at right angles to the phase voltage OC of phase C.

From the foregoing it will be seen that the magnetomotive forces of the respective currents OD and OF in the current and voltage coils 38 and 41 are substantially in phase opposition so that any operating effect, which the magnetizing current OD of the rectifier transformer might otherwise have, is cancelled out or compensated for by the magnetomotive force of current OF, it being noted in this connection that the current and voltage windings 38 and 41 are superimposed upon each other, as indicated, and are so wound that currents flowing in opposite directions in these windings have opposing effects in producing operating movement of switch element 46. The resistance 42 is so adjusted that the magnetomotive force of current OF is substantially equal to that of current OD. The voltage winding 41 and the associated parts or connections, accordingly, provide a compensating action for relay 39 for eliminating irregularities or errors which might otherwise occur in its operation due to the magnetizing current of the rectifier transformer.

The relay 39 may be provided with a dash-pot 52 to provide for such time-delay action thereof as might be found desirable.

The various parts are shown in the drawings as being in their respective operating positions when the substation is operating to feed the direct-current line 11 and the car or load 51, at which time the load current is substantially normal and sufficient to provide for excitation of winding 37 to such extent as to hold switch element 48 in position to short-circuit current-winding 38 of relay 39. When the car 51 passes beyond the substation a distance such that the load current OE drops to a value which current winding 38 can take, excitation of winding 37 is decreased by such amount that switch element 48 moves under the action of gravity or suitable spring means out of bridging relation with contacts 49 to open the short-circuit on winding 38 and into bridging relation with contacts 50. When the car 51 finally passes beyond the range of operation of the substation, and the load current OE drops accordingly to a predetermined low value below normal, excitation of current winding 38 will no longer be sufficient to hold switch element 46 in position out of contacting relation with contacts 47, whereupon this element will move into such relation under the action of gravity or suitable spring means and complete the tripping-circuit 29 to effect opening operation of circuit breaker 15 and consequent substantially simultaneous opening operation of circuit breaker 17.

From the foregoing, it will be seen that an improved rectifying system has been provided wherein the same is automatically disconnected from the direct-current line and shut down when the load current reaches a predetermined value below normal, the means providing for such automatic action being associated with the alternating-current side of the system and responsive to current conditions in the alternating-current line. It will be seen further that relay 36 and the associated switch element 48 and contacts 49 provide for the short-circuiting of current winding 38 of relay 39 under conditions whereat the load current is substantially normal. Winding 38 is therefore protected from relatively high currents and accordingly need be designed to carry only the relatively low currents existing when the automatic control is about to function to shut down the substation.

While but one embodiment of the present invention has been shown, it will be understood that various changes might be made without departing from the spirit of the invention or the scope of the claims.

The invention claimed is:

1. In a rectifying system, an alternating-current line, a direct-current line, means providing for current-rectifying action between said lines, switch means operable to provide an operating connection between said alternating-current line and said first-named means, and means associated with the alternating-current side of said system and responsive to current conditions in said alternating-current line and operable upon occurrence of such conditions whereat the current is of a value a predetermined amount below normal value to effect opening operation of said switch means, said third-named means comprising a relay having cooperating voltage and current windings.

2. In a rectifying system, a polyphase alternating-current line, a direct-current line, means providing for current-rectifying action between said lines, switch means operable to provide an operating connection between said first-named means and one of said lines, means responsive to a predetermined condition in said system and operable upon occurrence of such condition to effect opening operation of said switch means, said third-named means including a relay having cooperating voltage and current windings, means rendering said voltage winding responsive to voltage conditions between certain phases of said alternating-current line, and means rendering said current winding responsive to current conditions in a phase of said alternating-current line other than said certain phases.

3. In an electric current supply system, a source of alternating current supply, a current rectifying device, a switch operable to connect said source with said device, a direct current supply line, a switch operable to connect said device with said supply line, a circuit interlocking said switches to cause corresponding actuation of one of the same upon operation of the other of the same, and means operatively dependent upon current conditions in said source and voltage conditions in said supply line to cause operation of said switches.

4. In an electric current supply system, a source of alternating current, a current rectifying device, a switch operable to connect said source with said device, a direct current supply line, a switch operable to connect said device with said supply line, a plurality of circuits interlocking said switches to cause corresponding opening or closing action thereof, one of said circuits permitting opening movement of said switch controlled thereby and the other of said circuits causing closing movement of said switch controlled thereby, and means cooperatively dependent upon current conditions in said source and voltage conditions in said supply line to cause operation of said switches.

5. In an electric current supply system, a source of alternating current, a current rectifying device, a switch operable to connect said source with said device, a direct current supply line, a switch operable to connect said device with said supply line, a circuit interlocking said switches to cause corresponding actuation of one of the same upon operation of the other of the same, means dependent upon voltage conditions in said supply line for causing closing movement of one of said switches, and means dependent upon current conditions in said source to cooperate with said first-mentioned means for permitting opening movement of one of said switches.

6. In an electric current supply system, a source of alternating current, a current rectifying device, a switch operable to connect said source with said device, a direct current supply line, a switch operable to connect said device with said supply line, a circuit interlocking said switches to cause corresponding actuation of one of the same upon operation of the other of the same, a local circuit for opening and closing one of said switches, means dependent upon voltage conditions in said supply line for energizing one of said circuits to cause closing movement of one of said switches, and means dependent upon current conditions in said source to cooperate with said first-mentioned means for energizing another of said circuits to cause opening movement of one of said switches.

7. In an electric current supply system, a source of alternating current, a current rectifying device, a switch operable to connect said source with said device, a direct current supply line, a switch operable to connect said device with said supply line, a plurality of circuits interlocking said switches to cause corresponding opening or closing action thereof, one of said circuits permitting opening movement of said switch controlled thereby and the other of said circuits causing closing movement of the switch controlled thereby, local circuits for opening and closing one of said switches, means dependent upon voltage conditions in said supply line for energizing one of said circuits to cause closing movement of one of said switches, and means dependent upon current conditions in said source to cooperate with said first-mentioned means for energizing another of said circuits to permit opening movement of one of said switches.

In witness whereof, I hereto affix my signature this 25th day of March, A. D. 1929.

HAROLD WINOGRAD.